Patented June 20, 1933

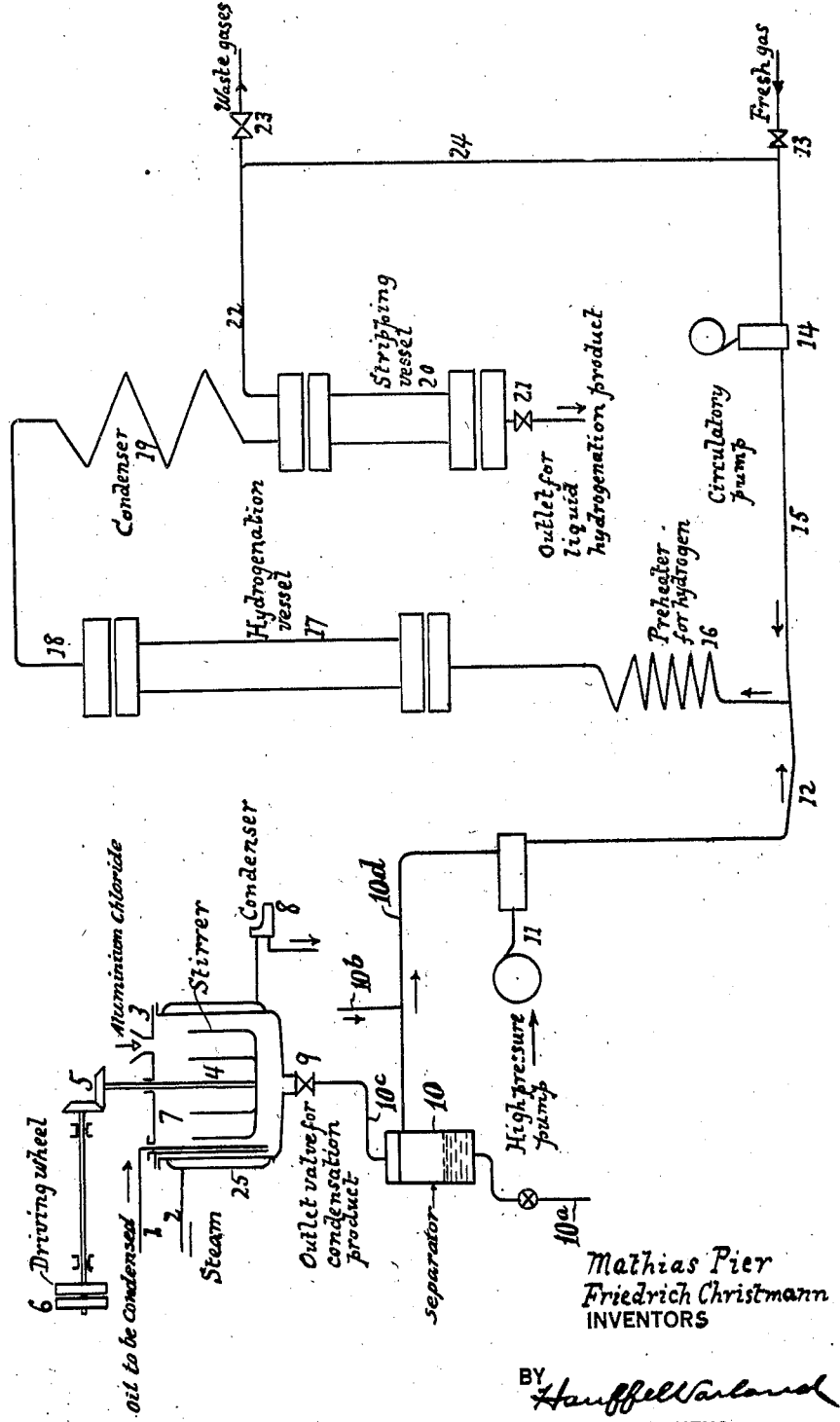

1,914,727

UNITED STATES PATENT OFFICE

MATHIAS PIER, OF HEIDELBERG, AND FRIEDRICH CHRISTMANN, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

PRODUCTION OF LUBRICATING OILS

Application filed May 29, 1929, Serial No. 367,121, and in Germany June 7, 1928.

Valuable hydrocarbons, for example benzines, have already been produced by the treatment of various kinds of coal, tars, mineral oils and the like with hydrogen under pressure and at elevated temperatures. It is also possible by maintaining milder conditions to obtain valuable products of high boiling point from which lubricating oils for example may be prepared.

We have now found that valuable lubricating oils are obtained when distillable liquid hydrocarbon products such as mineral oils, tars obtained in any manner, products obtained by the destructive hydrogenation of various kinds of coal, tars, mineral oils and the like are first subjected to a condensation and the products thus obtained are then subjected, wholly or in part, to a treatment with hydrogen at elevated temperatures, preferably under pressure, and if desired in the presence of catalysts.

By condensation we mean those reactions in which the molecules of the initial materials are combined to form larger molecules with or without the splitting off of atoms such as hydrogen, free halogens, oxygen, and sulphur, forming simple compounds such as water, hydrogen halides, and sulphuretted hydrogen. The course of the said condensation reactions may be illustrated by the following equations, but the term condensation is not restricted to these specific reactions.

In the case of condensing with chlorine:

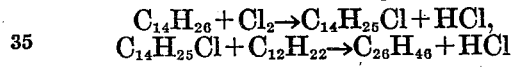

In the case of condensing with oxygen:

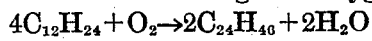

In the case of the combination of two equal molecules without the splitting out of atoms we have a specific condensation, i. e. the so-called polymerization.

The condensation may be carried out in different ways, for example at ordinary, elevated or reduced pressures, preferably with the employment of special condensing agents for example catalysts having a condensing action as for example halides and in particular anhydrous metal halides such as aluminium chloride, ferric chloride, boron fluoride, zinc chloride and the like, or phosphorus pentoxide or metaphosphates, and it may also be carried out at elevated temperatures in the presence of gases or vapours, having a condensing action, in particular gases containing or supplying oxygen for example air, industrial waste gases and the like, or steam, or gases which contain sulphur compounds such as sulphur dioxide or sulphuretted hydrogen, or chlorine or hydrochloric acid and the like, and if desired with the co-employment of catalysts having a dehydrogenating action as for example the oxides of the metals of the 8th group of the periodic system and in particular iron or the said metals themselves or vanadium pentoxide, masses containing manganese and the like. The said gases are injected, for example through porous layers, into the materials to be treated during the condensation. The temperatures employed in the condensation are, as may also be seen from the examples, highly dependent on the condensing agents employed. Any of the aforesaid treatments may also be employed in combination. In this manner, if necessary with the taking up of oxygen or sulphur and in some cases with the splitting off of hydrogen, resinous or asphaltic compounds are obtained from which lubricating oils are directly obtained in good yields and, if desired, solid paraffins by the subsequent treatment with hydrogen, preferably under pressure and at moderate temperatures and usually under such conditions that mainly reduction of the hydrocarbons takes place.

The subsequent treatment with hydrogen is also carried out under such conditions that only products of high boiling point are produced. In this manner no conversion into lower molecular substances takes place, i. e. the treatment is a non-destructive one.

Instead of hydrogen, gases containing or supplying hydrogen may be employed for the said treatment as for example carbon monoxide and water vapour, or mixtures of nitrogen and hydrogen, the said gases being comprised in the term hydrogen, wherever this is employed in the present application.

The treatment with hydrogen is preferably carried out in the presence of catalysts immune from poisoning by sulphur, and in particular of such catalysts comprising a metal from the 6th group of the periodic system or a compound thereof.

The temperatures employed for the treatment with hydrogen are moderate and usually range between about 250° and 550° C., and preferably between about 350° and 460° C.

Atmospheric pressure may be employed in the said treatment with hydrogen, but preferably elevated pressures are employed. Thus pressures of 5, 10, 20, 50, 100 up to 200 atmospheres and even more, for example of 1000 atmospheres may be employed with advantage.

If the treatment with hydrogen be carried out in the liquid phase, and solid catalysts be employed, these may be in a finely divided state and may be drawn off together with the products obtained. The particles of the catalyst are preferably removed from the liquid products prior to refining, for example, by distillation, preferably under reduced pressure or by filtration, or by centrifuging.

Catalysts comprising heavy metals from group 6 of the periodic system have proved to be of particular advantage for the subsequent hydrogenating treatment. These catalysts have been found to be very resistant to destruction caused by the unsaturated compounds present in the materials formed during the condensing treatment and by the resinous and often pitchy and coky polymerization products resulting therefrom and consequently excel by a longer working life than that observed with other catalysts.

One or both of the stages of the process may be carried out repeatedly.

As examples of initial materials may be mentioned oils of different kinds, for example tars, which have been obtained in various ways or which have been pretreated, mineral oils, fatty oils, shale oils, hydrogenation products of coals of all sorts, tars, mineral oils and also products from cracking and low temperature carbonization. In particular oils which already have a certain lubricating oil character, but which however have not the properties of valuable lubricating oils may be improved in this manner.

The present invention will be further described with reference to the accompanying drawing showing diagrammatically in vertical section a plant specially suitable for carrying out the process according to the invention, but the invention is not restricted to the special arrangement shown in the said drawing.

Hydrocarbon oil to be condensed is introduced by pipe 1 into the vessel 7 where it is subjected to condensation at elevated temperatures by means of aluminium chloride supplied by way of cone feed 3. The necessary heat is supplied by superheated steam introduced by way of pipe 2 into the heating jacket 25. The used heating steam is condensed in condenser 8. Stirring device 4 connected by the bevelled wheels 5 to the driving wheel 6 provides for an intensive stirring of the oil subjected to condensation. The condensed oil together with the waste aluminium chloride is withdrawn from vessel 7 by way of valve 9 and is passed by way of pipe 10c into the separating vessel 10 in which the aluminium chloride residues separate from the condensed oil by collecting at the bottom of this vessel. The said residues are withdrawn at $10^a$ and may be freed from aluminium chloride by treatment with water, the oily constituents being mixed at $10^b$ with the condensed oil leaving the upper part of said separator 10 by way of pipe 10d or being used for any other desired purpose. The condensed oil is then supplied to the hydrogenation vessel 17 by way of high pressure pump 11, pipe 12 and preheater 16. The necessary hydrogenating gas is supplied to vessel 17 by way of valve 13, circulatory pump 14, pipe 15 and preheater 16. From the vapors escaping together with the liquid hydrogenation products from vessel 17 into pipe 18 the condensable constituents are condensed in condenser 19, whereupon the condensed and the uncondensable products are passed into the stripping vessel 20. From this vessel the waste gases may be withdrawn by pipe 22 and valve 23 or they may be returned to the process by way of pipes 22 and 24. The liquid hydrogenation product collected in vessel 20 is withdrawn by valve 21.

The following examples will further illustrate how the said invention may be carried out in practice but the invention is not restricted to these examples.

*Example 1*

Air is led through a porous plate at a temperature of from 160° to 180° centigrade into an oil, which has a boiling point of from 280° to 350° centigrade and a viscosity of 2.5° Engler at 20° centigrade and 1.4° Engler at 50° centigrade, obtained by the destructive hydrogenation of brown coal and to which has been added 5 per cent of vanadium pentoxide. A product is obtained which in addition to the unchanged fraction contains asphaltums, resins and lubricating oils. This product is then led together with hydrogen at a temperature of from about 430° to 450° centigrade and under a pressure of 200 atmospheres over a catalyst prepared from molybdic acid, zinc oxide and magnesia. A lubricating oil having a flashpoint of 191° centigrade and a viscosity of 14° Engler at 50° centigrade and having the character of a heavy machine oil is isolated in good yields from the product thus obtained. A still higher yield of lubricating oil is obtained when the treatment with hydrogen is carried out at about 1000 atmospheres.

Example 2

A heavy benzine having a boiling point range of 180° to 250° centigrade obtained by the destructive hydrogenation of brown coal is passed at about 700° centigrade together with steam with a high velocity of flow over an iron catalyst activated with an addition of a small amount of alkali. The product thus obtained contains, besides benzine and a little heavy benzine, constituents of high boiling point having a marked unsaturated character and a content of asphaltum of about 30 per cent. The constituents of high boiling point from this product are led in the liquid phase together with hydrogen at a pressure of about 1000 atmospheres and at a temperature of about 430° centigrade over a catalyst prepared from molybdic acid, chromic acid and manganese dioxide. A lubricating oil having a flash-point of 195° centigrade and a viscosity of 5.6° Engler at 50° centigrade is obtained in good yields.

Example 3

Crude brown coal is made up into a paste with a product of the destructive hydrogenation of coal, about 80 per cent of which boils above 350° centigrade and is treated in a high-pressure reaction vessel at a temperature of about between 430° and 450° centigrade and under a pressure of about 200 atmospheres with hydrogen in the presence of a catalyst prepared from molybdic acid with a suitable addition. In this treatment products of lower boiling point are obtained, in particular middle oils, which are removed from the reaction vessel together with the gases issuing therefrom. The constituents of high boiling point are drawn off together with those constituents of the coal, which have not been liquefied and are treated with air at a temperature of about 250° centigrade which is, if desired, introduced by being passed through a layer of porous material. Products of high boiling point are thus obtained from which by treatment with hydrogen in the presence of a catalyst prepared from molybdic acid, chromic acid at about 200° centigrade and under a pressure of 1000 atmospheres valuable lubricating oils are obtained in an amount of about 30 per cent of the total oils recovered from the coal.

Example 4

Brown coal is made up into a paste with a heavy oil boiling between about 250 and 300° centigrade and is passed through a high pressure reaction vessel without hydrogen at a temperature of about 380° centigrade and under a pressure of about 200 atmospheres. About 50 to 60 per cent of the coal are thus liquefied. After separating off the solid constituents air is blown through the liquid products in the manner described in Example 3. A very considerable increase in the amount of products of high boiling point and of asphaltums is thus effected, for example, the content in asphaltum increasing from 2.5 per cent to 12 per cent. The constituents of high boiling point of the products thus obtained are thereupon subjected to a treatment with hydrogen in the presence of a catalyst prepared from tungstic acid with a suitable addition at about 390° to 430° centigrade and at about 1000 atmospheres pressure, a yield of valuable lubricating oils and Diesel oils being thus obtained similar to that obtained according to Example 1.

Example 5

A middle oil boiling between about 200 and 300° centigrade obtained by the destructive hydrogenation of brown coal is subjected to condensation by treatment with chlorine at a temperature of about 120° centigrade and with an addition of about 5 per cent of aluminium chloride. The highly viscous product thus obtained is passed together with hydrogen at a temperature of between about 400 and 450° centigrade and under a pressure of about 200 atmospheres over a catalyst prepared from molybdic acid, tungstic acid and zinc oxide. A yield of about 20 to 40 per cent of a lubricating oil which may be employed in motors is thus obtained.

Example 6

An oil obtained by destructive hydrogenation of pit coal and about 80 per cent of which boil up to about 350° centigrade is treated with hydrogen sulphide and sulphur dioxide at a temperature of about 230° centigrade. The condensation products rich in resins and asphaltum thus obtained are thereupon subjected to a catalytic treatment with hydrogen under pressure. An excellent engine oil is obtained with a yield of about 20 to 30 per cent.

Example 7

A brown coal tar middle oil boiling between about 250 and 400° centigrade is subjected to condensation with aluminium chloride at a temperature of between about 80 and 100° centigrade, while passing in gases containing olefines derived from cracking processes. The product thus obtained which is rich in resins is subjected to a catalytic treatment with hydrogen under a pressure of about 200 atmospheres and at a temperature of about 400° centigrade in the presence of a catalyst prepared from molybdic acid and zinc oxide after those constituents which are already suitable for employment as lubricating oils have been separated off. Besides well saturated first runnings lubricating oils of different viscosities are obtained with a yield of about 40 to 60 per cent.

What we claim is:—

1. A process for the production of lubricating oils from liquid hydrocarbon products, which comprises subjecting a liquid hydrocarbon product to a chemical condensation in the presence of an anhydrous metal halide and the product thus obtained to a non-destructive reduction treatment with hydrogen at a temperature between about 250° and 460° centigrade and under superatmospheric pressure ranging between 5 and 1000 atmospheres in the presence of a catalyst immune from poisoning by sulphur.

2. A process for the production of lubricating oils from liquid hydrocarbon products, which comprises subjecting a liquid hydrocarbon product to a chemical condensation in the presence of an anhydrous metal halide at a temperature between about 80 and 100° centigrade and the product thus obtained to a non-destructive reduction treatment with hydrogen at a temperature between about 250° and 460° centigrade and under superatmospheric pressure ranging between 5 and 1000 atmospheres in the presence of a catalyst immune from poisoning by sulphur.

3. A process for the production of lubricating oils from liquid hydrocarbon products, which comprises condensing a middle oil with the aid of aluminium chloride at a temperature between about 80 and 100° centigrade, while passing in a gas containing an olefine and subjecting the product rich in resins thus obtained to a non-destructive treatment with hydrogen at a temperature between about 350° and 460° centigrade and under superatmospheric pressure ranging between 5 and 1000 atmospheres in the presence of a catalyst comprising a compound of a metal of the 6th group of the periodic system.

4. A process for the production of lubricating oils from liquid hydrocarbon products, which comprises condensing a middle oil with the aid of aluminium chloride at a temperature between about 80 and 100° centigrade, while passing in a gas containing olefines derived from a cracking process and subjecting the product rich in resins thus obtained to a nondestructive treatment with hydrogen at a temperature of about 400° centigrade and under a pressure of about 200 atmospheres in the presence of a catalyst prepared from molybdic acid and zinc oxide.

5. A process for the production of lubricating oils from liquid hydrocarbon products, which comprises subjecting a liquid hydrocarbon product to a chemical condensation and the product thus obtained to a non-destructive reduction treatment with hydrogen at a temperature between about 250° and 450° C. and under superatmospheric pressure ranging between 5 and 1000 atmospheres in the presence of a catalyst comprising a heavy metal selected from group 6 of the periodic system.

6. A process for the production of lubricating oils from liquid hydrocarbon products, which comprises subjecting a liquid hydrocarbon product to a chemical condensation and the product thus obtained to a non-destructive reduction treatment with hydrogen at a temperature between about 250° and 400° C. and under superatmospheric pressure ranging between 5 and 1000 atmospheres in the presence of a catalyst comprising a heavy metal selected from group 6 of the periodic system.

7. A process for the production of lubricating oils from liquid hydrocarbon products, which comprises subjecting a liquid hydrocarbon product to a chemical condensation in the presence of an anhydrous metal halide at a temperature between about 80° and 100° C. and the product thus obtained to a non-destructive reduction treatment with hydrogen at a temperature between about 250° and 450° C. and under superatmospheric pressure ranging between 5 and 1000 atmospheres in the presence of a catalyst comprising a heavy metal selected from group 6 of the periodic system.

8. A process for the production of lubricating oils from liquid hydrocarbon products, which comprises subjecting a liquid hydrocarbon product to a chemical condensation in the presence of an anhydrous metal halide at a temperature between about 80° and 100° C. and the product thus obtained to a non-destructive reduction treatment with hydrogen at a temperature between about 250° and 400° C. and under superatmospheric pressure ranging between 5 and 1000 atmospheres in the presence of a catalyst comprising a heavy metal selected from group 6 of the periodic system.

In testimony whereof we have hereunto set our hands.

MATHIAS PIER.
FRIEDRICH CHRISTMANN.